US012775640B2

(12) United States Patent
Nagireddyvari et al.

(10) Patent No.: US 12,775,640 B2
(45) Date of Patent: Oct. 27, 2026

(54) DATA PROCESSING SYSTEM WITH LINKAGE ANALYSIS

(71) Applicant: Capital One Services, LLC, McLean, VA (US)

(72) Inventors: Naveen Reddy Nagireddyvari, Frisco, TX (US); Ganesh Kumar Raja Shanmuga Sundaram, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/782,324

(22) Filed: Jul. 24, 2024

(65) Prior Publication Data

US 2026/0030265 A1 Jan. 29, 2026

(51) Int. Cl.
*G06F 16/00* (2019.01)
*G06F 16/28* (2019.01)

(52) U.S. Cl.
CPC .................................. *G06F 16/287* (2019.01)

(58) Field of Classification Search
None
See application file for complete search history.

(56) References Cited

U.S. PATENT DOCUMENTS 10,353,911 B2 * 7/2019 Reynolds .............. G06F 16/258
10,521,419 B1 * 12/2019 Swamy .............. G06Q 10/0639
11,188,236 B2 * 11/2021 Cherubini ............. G06F 3/0653
11,556,510 B1 * 1/2023 Hanson ............... G06F 16/2379
11,755,536 B1 9/2023 Pushkin
12,182,180 B1 * 12/2024 Karasudha Patnaik ...................... G06F 16/287
12,204,873 B1 * 1/2025 Toledano .............. G06F 16/215
2003/0220949 A1 * 11/2003 Witt, Jr. ................ G06F 12/023
2013/0144908 A1 * 6/2013 Geroulo .................. G06F 16/20 707/E17.041
2014/0282626 A1 * 9/2014 Muguda ................ H04L 47/781 719/328
2016/0364434 A1 * 12/2016 Spitz ..................... G06F 16/248
2017/0220670 A1 8/2017 Caldwell
2017/0364568 A1 * 12/2017 Reynolds .............. G06F 3/0484
(Continued)

OTHER PUBLICATIONS

International Search Report and Written Opinion for Application No. PCT/US2025/037119, mailed on Oct. 7, 2025, 12 pages.

*Primary Examiner* — Polina G Peach
(74) *Attorney, Agent, or Firm* — Harrity & Harrity, LLP

(57) ABSTRACT

In some implementations, a device may receive information identifying a set of data reports generated from a group of datasets. The device may request from a data source storing the group of datasets, and based on receiving the information identifying the set of data reports, source data associated with the set of data reports. The device may receive the source data associated with the set of datasets. The device may associate the source data with data lineage information identifying a set of connections between the group of datasets. The device may generate, based on associating the source data with the data lineage information, a processed data representation, wherein the processed data representation includes information identifying a set of relationships associated with the group of datasets, the set of data reports, and a set of usage metrics. The device may transmit information identifying the processed data representation.

20 Claims, 6 Drawing Sheets

(56) References Cited

U.S. PATENT DOCUMENTS

| | | | | |
|---|---|---|---|---|
| 2018/0075095 | A1* | 3/2018 | Srivastava | G06F 16/213 |
| 2018/0131803 | A1* | 5/2018 | Ellis | G09G 5/005 |
| 2019/0095390 | A1* | 3/2019 | Gould | G06F 16/2452 |
| 2019/0188308 | A1* | 6/2019 | Simon | G06F 16/219 |
| 2019/0362245 | A1* | 11/2019 | Buda | G06F 17/18 |
| 2021/0019652 | A1* | 1/2021 | Gadelrab | G06F 11/3409 |
| 2021/0149886 | A1* | 5/2021 | Zheng | G06N 5/02 |
| 2021/0209123 | A1* | 7/2021 | O'Connor | G06F 21/565 |
| 2021/0248132 | A1 | 8/2021 | Hain et al. | |
| 2021/0334254 | A1* | 10/2021 | Thompson | G06Q 10/06315 |
| 2022/0027379 | A1* | 1/2022 | Unterbrunner | G06F 16/254 |
| 2022/0076164 | A1* | 3/2022 | Conort | G06N 20/00 |
| 2022/0156267 | A1* | 5/2022 | James | G06F 16/2455 |
| 2022/0180179 | A1* | 6/2022 | Gusat | G06F 16/22 |
| 2023/0103011 | A1* | 3/2023 | Zaroo | G06F 11/3485<br>707/713 |
| 2023/0289698 | A1* | 9/2023 | Bly | G06Q 10/06393 |
| 2023/0362263 | A1 | 11/2023 | Albero et al. | |
| 2024/0211476 | A1* | 6/2024 | Shroff | G06F 16/248 |
| 2024/0256576 | A1* | 8/2024 | Weisman | G06F 16/287 |
| 2025/0384341 | A1* | 12/2025 | Cella | G06N 20/00 |

* cited by examiner

DATA PROCESSING SYSTEM WITH LINKAGE ANALYSIS

BACKGROUND

Data sources may provide databases or other data structures that can be queried using a query language. For example, a server may receive a structured query language (SQL) instruction and use the SQL instruction to generate a data output or manipulate data in an instructed manner. Some data sources may be subject to hundreds, thousands, or millions of queries per day. Some reports, which may include data outputs from a data source, may be dynamically linked to underlying data of the data source, resulting in dynamic updating of the reports when new data is generated.

SUMMARY

Some implementations described herein relate to a system for data processing. The system may include one or more memories and one or more processors communicatively coupled to the one or more memories. The one or more processors may be configured to receive information identifying a set of data reports generated from a group of datasets. The one or more processors may be configured to request, from a data source storing the group of datasets, source data associated with the set of data reports based on receiving the information identifying the set of data reports. The one or more processors may be configured to receive, from the data source, the source data associated with the set of datasets. The one or more processors may be configured to associate the source data with data lineage information identifying a set of connections between the group of datasets. The one or more processors may be configured to process, based on associating the source data with the data lineage information, the source data, the data lineage information, and a set of usage metrics associated with the set of data reports to generate a processed data representation, wherein the processed data representation includes information identifying a set of relationships associated with the group of datasets and the set of data reports. The one or more processors may be configured to transmit, to a client device, information identifying the processed data representation.

Some implementations described herein relate to a non-transitory computer-readable medium that stores a set of instructions. The set of instructions, when executed by one or more processors of a system, may cause the system to receive information identifying a set of data reports generated from a group of datasets. The set of instructions, when executed by one or more processors of the system, may cause the system to request, from a data source storing the group of datasets, source data associated with the set of data reports based on receiving the information identifying the set of data reports. The set of instructions, when executed by one or more processors of the system, may cause the system to receive, from the data source, the source data associated with the set of datasets. The set of instructions, when executed by one or more processors of the system, may cause the system to associate the source data with data lineage information identifying a set of connections between the group of datasets. The set of instructions, when executed by one or more processors of the system, may cause the system to process, based on associating the source data with the data lineage information, the source data, the data lineage information, and a set of usage metrics associated with the set of data reports to generate a processed data representation, wherein the processed data representation includes information identifying a set of relationships associated with the group of datasets and the set of data reports. The set of instructions, when executed by one or more processors of the system, may cause the system to receive information identifying a dataset, of the group of datasets. The set of instructions, when executed by one or more processors of the system, may cause the system to generate, using the processed data representation, a visualization relating to usage of the dataset in connection with the set of reports. The set of instructions, when executed by one or more processors of the system, may cause the system to provide, for display via a user interface of a client device, information identifying the visualization.

Some implementations described herein relate to a method. The method may include receiving, by a device, information identifying a set of data reports generated from a group of datasets. The method may include requesting, by the device, from a data source storing the group of datasets, and based on receiving the information identifying the set of data reports, source data associated with the set of data reports. The method may include receiving, by the device and from the data source, the source data associated with the set of datasets. The method may include associating, by the device, the source data with data lineage information identifying a set of connections between the group of datasets. The method may include generating, by the device and based on associating the source data with the data lineage information, a processed data representation, wherein the processed data representation includes information identifying a set of relationships associated with the group of datasets, the set of data reports, and a set of usage metrics. The method may include transmitting, by the device and to a client device, information identifying the processed data representation.

DETAILED DESCRIPTION

Figure 1A:
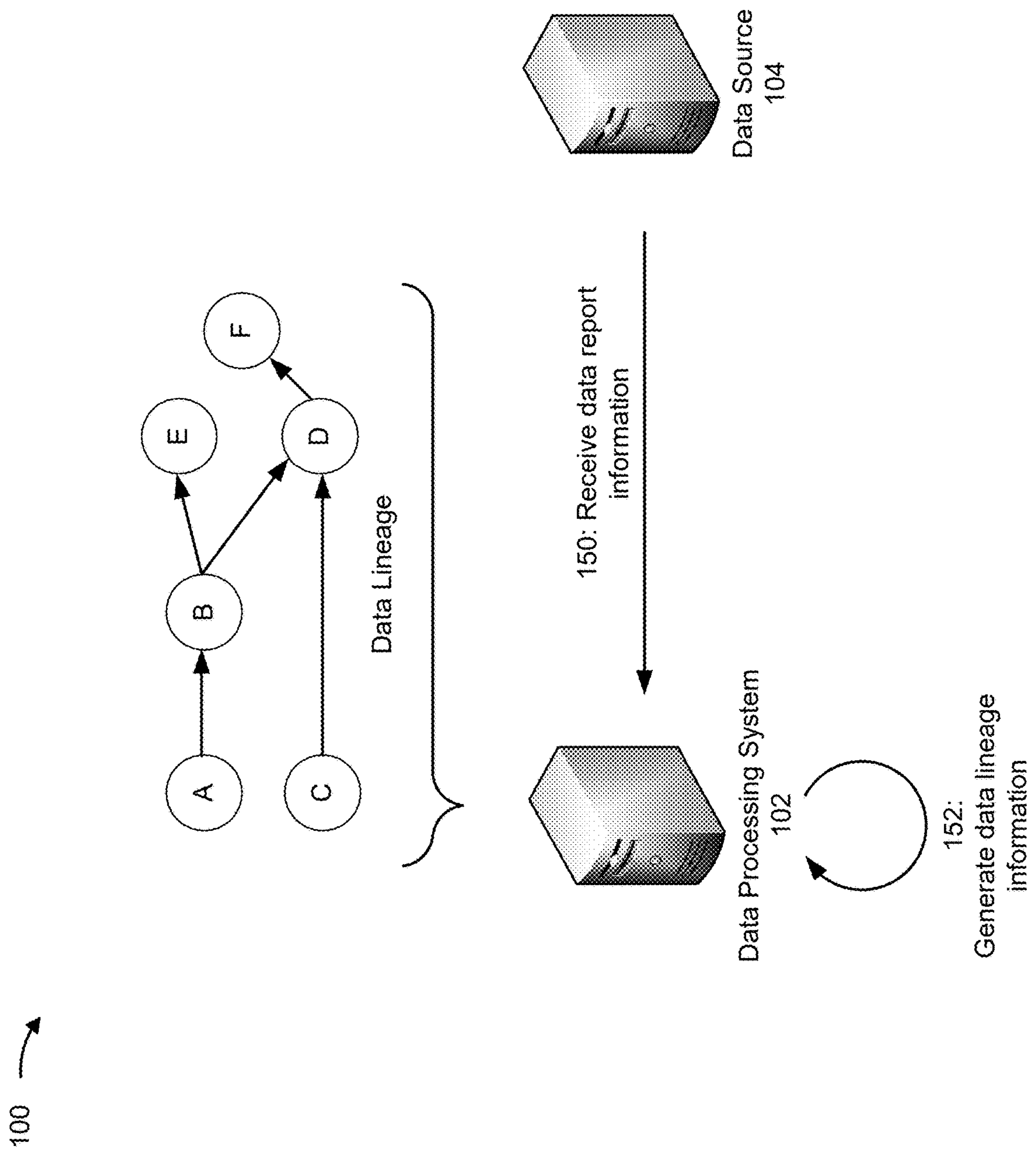
FIGS. 1A-1C are diagrams of an example implementation associated with using a data processing system for linkage analysis, in accordance with some embodiments of the present disclosure.

The following detailed description of example implementations refers to the accompanying drawings. The same reference numbers in different drawings may identify the same or similar elements.

Data sources may store data entries for many different data structures. A system may include one or more applications or functions that request datasets from a data source, process the datasets, and provide output datasets based on processing the dataset. For example, a health platform may receive input datasets with healthcare data relating to treatment of a set of patients, process the healthcare data, and generate output datasets characterizing the treatment of the set of patients. In another example, an anonymization system may receive input datasets with private information, such as health information or demographic information, may process the input datasets to anonymize the input datasets, and may provide output datasets with anonymized data for further use. In yet another example, a transaction system may receive input datasets identifying a set of economic indicators, process the input datasets to determine a transaction cost or risk, and generate an output dataset that includes a price for a transaction.

With increasingly large amounts of data being used by organizations, it has become increasingly difficult to identify and correct errors in data management systems. For example, with many applications or functions providing data queries, receiving responses, processing data, and generating new datasets, tracing an error occurring in a dataset may involve detailed analysis of the dataset, which may be a resource and time intensive process. Additionally, or alternatively, ensuring compliance with regard to data usage, data privacy, and data removal may be increasingly difficult as an amount of data and an interconnectedness of the data increase.

Some implementations described herein may provide a data processing system to perform linkage analysis on datasets and generate a data reporting and visualization ecosystem for orchestrating complex data environments. For example, the data processing system may collect information relating to a data ecosystem, a data health, a data resource utilization, a data usage, or a set of key performance indicators and may use the information to generate one or more outputs. The one or more outputs may include a set of user interface visualizations of the data, a set of control actions, or another type of output to orchestrate or control a data environment.

Based at least in part on the data processing system processing and orchestrating a data environment, the data processing system may conserve computing, power, network, and/or communication resources that may have otherwise been consumed by manually inspecting data to identify and resolve errors. For example, based at least in part on proactive mapping of a data environment, the data processing system may avoid unexpected errors when altering datasets or bringing new applications or functions online, which may reduce an error rate, and which may conserve computing, power, network, and/or communication resources that may have otherwise been consumed to detect and/or correct errors.

Figure 1B:
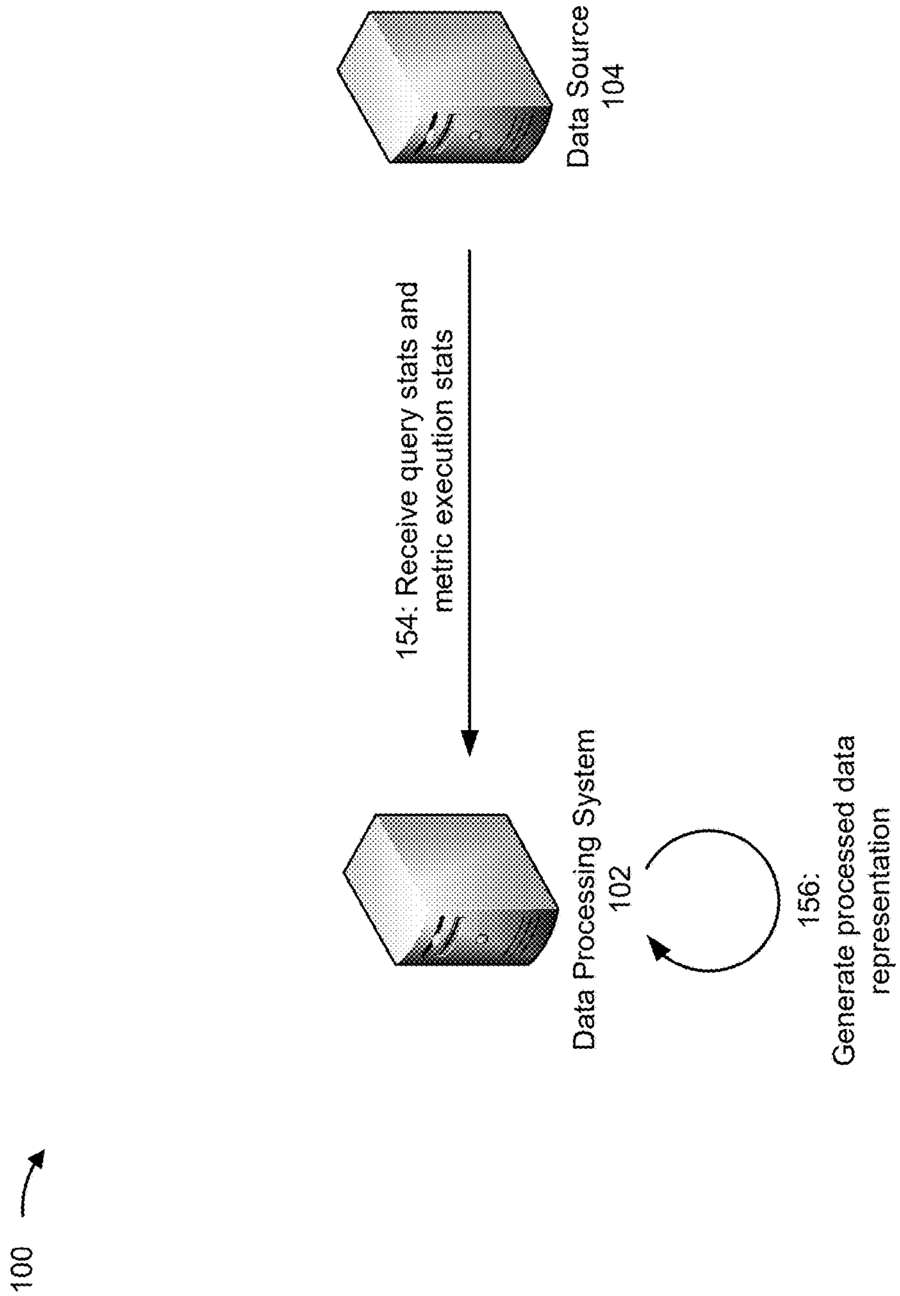
Figure 1C:
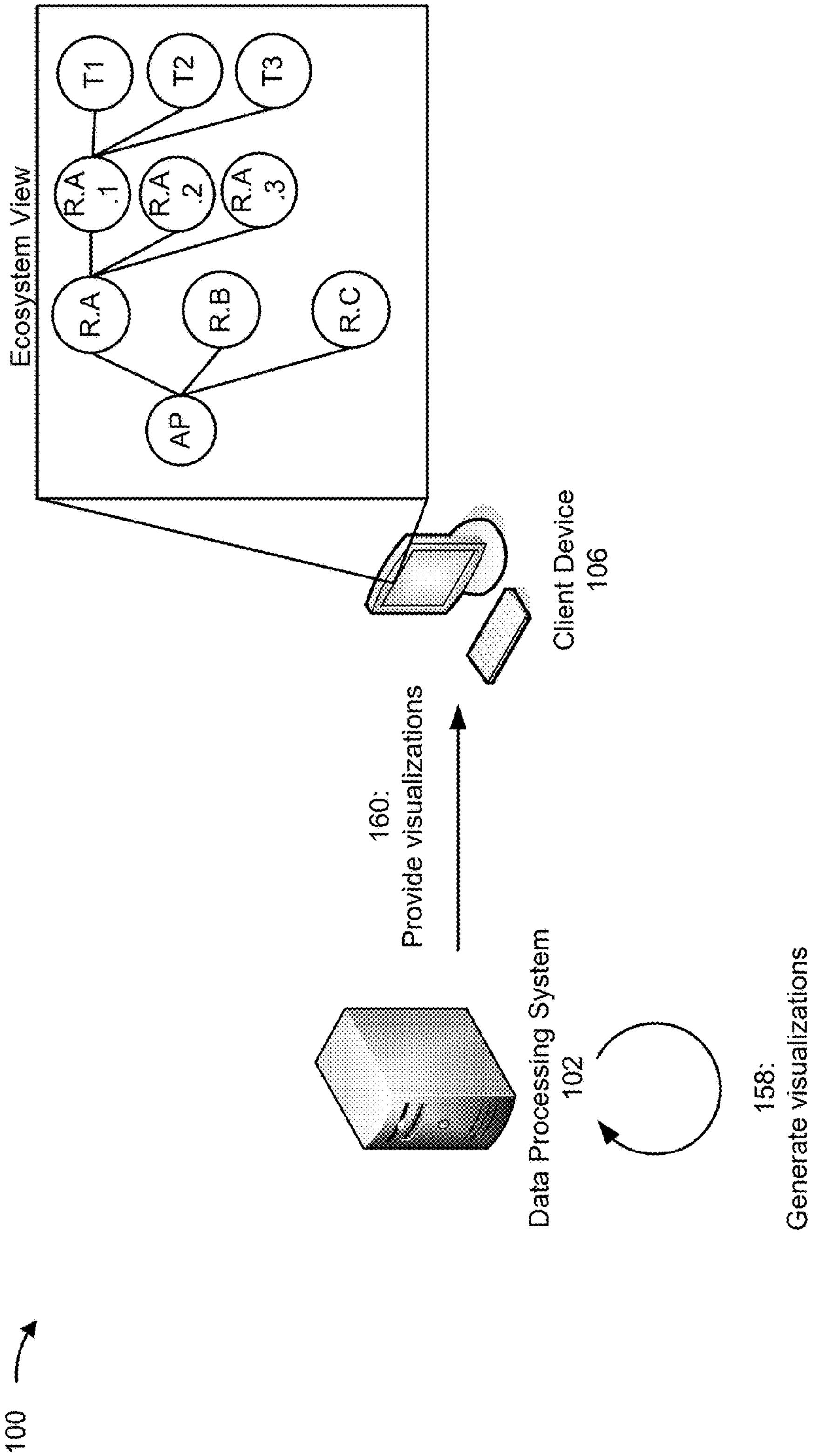

FIGS. 1A-1C are diagrams of an example implementation 100 associated with using a data processing system for linkage analysis. As shown in FIGS. 1A-1C, example implementation 100 includes a data processing system 102, a data source 104, and a client device 106. These devices are described in more detail below in connection with FIG. 2 and FIG. 3.

As shown in FIG. 1A, and by reference number 150, the data processing system 102 may receive data report information. For example, the data processing system 102 may receive information identifying a group of datasets associated with or stored by the data source 104 or a platform (e.g., a cloud computing system) associated therewith. The group of datasets may include one or more input datasets (e.g., one or more datasets that are inputs to one or more functions or applications associated with a platform). For example, a computing platform may include a set of functions or applications that execute on the platform and may request the one or more input datasets from the data source 104 to perform a set of calculations with the one or more input datasets. The group of datasets may include one or more output datasets. For example, the computing platform may include a set of functions or applications that execute on the platform and generate the one or more output datasets as one or more results of performing a set of calculations.

As further shown in FIG. 1A, and by reference number 152, the data processing system 102 may generate data lineage information. For example, the data processing system 102 may determine a set of linkages between datasets of a group of a datasets and represent the set of linkages as data lineage information. Data lineage information may include a representation of linkages between datasets in connection with the datasets being processed by one or more functions or applications. For example, data lineage information may include a set of hops, with each hop representing a processing step in which an input dataset is transformed into an output dataset (which may be an input dataset to another hop). In some implementations, the data processing system 102 may receive data lineage information. For example, the data processing system 102 may receive information identifying the data lineage information generated by another system.

Accordingly, as shown in one example, the data processing system 102 may identify a first dataset A, which is transformed into a second dataset B by a process. The second dataset B and a third dataset C are processed to generate a fourth dataset D. Further, the second dataset B is processed to generate a fifth dataset E. The fourth dataset D is processed to generate a sixth dataset F.

The data processing system 102 may perform one or more de-duplication steps, code inspection steps, graph generation steps, or other steps to generate the data lineage. For example, the data processing system 102 may generate a set of nodes, of a graph, representing the group of datasets and a set of edges, of the graph, representing processing by one or more applications or functions. In some implementations, the data processing system 102 may use a lineage generator module or component to generate the data lineage information. For example, the data processing system 102 may receive, at a lineage generator module, first data identifying a group of datasets, and the lineage generator module may communicate with a codebase to receive second data identifying a set of components or applications. In this case, the lineage generator module of the data processing system 102 may parse the codebase to correlate datasets with applications or functions in the codebase that call, use, reference, or generate the datasets. Based on parsing the codebase, the data lineage generator of the data processing system 102 may generate data lineage information and store the data lineage information via a data structure, such as via the data source 104. By representing the group of datasets using a graph and a dataset lineage technique, the data processing system 102 may efficiently trace linkages between datasets and trace functions or applications associated with errors that are detected in a group of datasets, as described in more detail herein.

As shown in FIG. 1B, and by reference number 154, the data processing system 102 may receive information associated with one or more datasets. For example, the data processing system 102 may receive information identifying one or more metrics, such as query statistics or metric execution stats, related to one or more datasets in the group of datasets and/or the data lineage of the group of datasets. Query statistics may include one or more metrics regarding queries that reference the one or more datasets. For example, when the data source 104 receives a query from an application, the data source 104 may store a record of the query and may provide the record to the data processing system 102. The record may include information identifying a source for the query, a target dataset for the query, a result of the query, a time at which the query was sent, a frequency of the query, or another metric relating to the query. Metric execution statistics may include one or more metrics relating to execution of one or more applications or functions. For example, the metric execution statistics may include information identifying a timing, a result, an occurrence of refreshing an application or function, a resource utilization, or another metric relating to execution of an application or function. The applications or functions may include web applications, data reports, or other usages of datasets.

As further shown in FIG. 1B, and by reference number 156, the data processing system 102 may generate a processed data representation. For example, the data processing system 102 may perform a set of computations on source data (e.g., the one or more data sets), the data lineage (e.g., a graph representation of the one or more datasets), or the information associated with the one or more datasets (e.g., metric execution statistics or query statistics), among other examples. In some implementations, the data processing system 102 may determine one or more characteristics of the one or more datasets to generate the processed data representation. In other words, the processed data representation may include one or more characteristics of the one or more datasets that form a representation of the one or more datasets and is generated by processing information relating to the one or more datasets.

In some implementations, the data processing system 102 may determine a set of data ecosystem metrics. For example, the data processing system 102 may determine a set of data ecosystem metrics representing an interconnectedness of the one or more datasets. For example, the data processing system 102 may determine a set of quantities (or other metrics), such as a quantity of metrics, a quantity of reports, a quantity of datasets, or a quantity of users, and generate one or more linkages or graphs representing an interconnectedness of the set of quantities.

In some implementations, the data processing system 102 may determine a set of health metrics. For example, the data processing system 102 may determine a set of data pipelines (e.g., established for providing data from or to the data source 104) that are operating or not operating, an execution failure rate (e.g., a failure rate when executing functions or applications on the one or more datasets), a quantity of execution failures, a history of execution failures, or another metric. In this case, the data processing system 102 may set one or more triggering thresholds. For example, the data processing system 102 may automatically set a threshold, based on a statistical analysis of the set of health metrics, such that when a health metric deviates beyond the threshold, the data processing system 102 is automatically triggered to perform a response action, such as transmitting an alert or analyzing a failure.

In some implementations, the data processing system 102 may determine a set of data ecosystem costs. The set of data ecosystem costs may include information associated with resources that are used in connection with the one or more datasets, such as memory usage for storing the one or more datasets, processor usage for accessing, providing, storing, generating, or manipulating the one or more datasets, energy usage associated with the processor usage, or another ecosystem cost. For example, the data processing system 102 may determine a set of quantities, such as a quantity of metrics, a quantity of reports, a quantity of datasets, or a quantity of users, and may process the set of quantities to generate a dynamic mapping of connections between the set of quantities.

In some implementations, the data processing system 102 may determine usage data. For example, the data processing system 102 may determine a total usage of the one or more datasets, a report-level usage of the one or more datasets (e.g., how often each report that is generated uses a dataset), a metric or dataset level usage (e.g., how often each metric or dataset that is generated uses a particular data element), or another type of usage. In some implementations, the data processing system 102 may determine whether one or more datasets satisfy a threshold level of usage. For example, for a first threshold level of usage (e.g., frequent usage), the data processing system 102 may determine to allocate additional resources (e.g., processing resources or backup resources) to supporting a dataset satisfying the first threshold level of usage. In contrast, for a second threshold level of usage (e.g., infrequent usage or a lack of usage), the data processing system 102 may determine to remove the dataset from the one or more datasets and reallocate resources associated with storing the dataset toward another purpose.

In some implementations, the data processing system 102 may determine a set of key performance indicators (KPIs). The KPIs may include a subset of the processed data representation (e.g., one or more metrics) that the data processing system 102 determines are associated with a threshold relevance or a threshold correlation to a particular result. For example, the data processing system 102 may process information relating to the one or more datasets using a machine learning algorithm or an artificial intelligence algorithm to identify one or more metrics with a threshold correlation with a failure occurring, a resource shortage occurring, a trouble ticket being submitted, or another result. In this case, the data processing system 102 may designate the one or more metrics as KPIs for the one or more results and may set one or more thresholds for measuring deviation of the KPIs.

As shown in FIG. 1C, and by reference number 158, the data processing system 102 may generate a set of visualizations of the processed data representation. For example, the data processing system 102 may generate one or more visualizations of one or more groups of metrics determined for the processed data representation. In this case, the data processing system 102 may generate a visualization of the data ecosystem metrics, the health metrics, the data ecosystem costs, the data usage metrics, or the KPIs. For example, in an ecosystem view, the data processing system 102 may generate a visualization that illustrates a quantity of reports, a quantity of metrics, a quantity of users, a set of costs, and/or a set of connections between an application ("AP"), a set of reports ("R.A", "R.B", "R.C"), a set of sub-reports included in different categories of the set of reports ("R.A.1", "R.A.2", "R.A.3"), and/or a set of tables (e.g., datasets) from which the set of reports is generated ("T1", "T2", "T3"). Similarly, in a health status view, the data processing system 102 may generate a visualization that illustrates a set of failures, a set of successes, or a set of connections between a set of source tables and a set of reports generated from the set of source tables (e.g., and a location of failures in a process of generating the set of reports from the set of source tables), among other examples. Similarly, in the data ecosystem costs view, the data processing system 102 may generate a visualization that illustrates one or more resource costs (e.g., resource usage or a cost associated with providing one or more resources) over one or more different time scales. Similarly, in a usage view, the data processing system 102 may generate a visualization that illustrates a set of reports, a set of time periods in which the set of reports were accessed or generated, a set of users of a set of client devices that accessed the set of reports, a set of usage trends, or another metric. Similarly, in a KPI view, the data processing system 102 may generate a visualization that illustrates a set of KPIs, a set of reports or datasets associated with the set of KPIs, or a set of metrics from which the set of KPIs is derived.

As further shown in FIG. 1C, and by reference number 160, the data processing system 102 may provide the set of visualizations for display. For example, the data processing system 102 may cause one or more visualizations to be provided for display via the client device 106. In some implementations, the data processing system 102 may perform one or more actions based on generating the processed data representation and/or the set of visualizations. For example, the data processing system 102 may transmit an alert to the client device 106 indicating that the set of visualizations is generated and is available for viewing. Additionally, or alternatively, the data processing system 102 may track a deviation in a metric associated with the one or more visualizations and may transmit an alert when the deviation in the metric satisfies a threshold amount of deviation. Additionally, or alternatively, the data processing system 102 may trace a location of an error or failure associated with a dataset included in the set of visualizations and may automatically provide information identifying the location of the error or the failure.

In some implementations, the data processing system 102 may have an automatic (e.g., a machine learning model, artificial intelligence model, or large-language model (LLM) based) code debugging or code generation tool. For example, the data processing system 102 may locate a report associated with an error, generate new code for the report, and replace existing code with the new code to resolve the error automatically and/or to transform an original dataset to resolve the error. For example, the data processing system 102 may automatically transform a format of a dataset to generate a transformed dataset that can be ingested into a function and resolve an error associated with the original dataset. In some implementations, the data processing system 102 may transform the original dataset using one or more data transformation rules, which include a set of weights of a machine learning model or a set of mappings of different data formats.

In some implementations, the data processing system 102 may receive approval of the new code via a user interface of a visualization, of the one or more visualizations, before replacing the existing code with the new code. In some implementations, the data processing system 102 may generate a plain language description of one or more metrics in the processed data representation. For example, the data processing system 102 may use a language generation tool, such as an artificial intelligence tool, a machine learning tool, or an LLM tool to interpret one or more metrics in the processed data representation and provide an explanation of the one or more metrics in plain language for a reviewer.

In some implementations, the data processing system 102 may automatically reallocate resources. For example, the data processing system 102 may identify a dataset for additional resources or for removal and may allocate new resources to the dataset or may remove the dataset (e.g., based on usage metrics). In some implementations, the data processing system 102 may transmit a status update relating to the one or more datasets. For example, the data processing system 102 may transmit an alert indicating whether the one or more datasets satisfy a status score threshold. In this case, the status score threshold may be based on an error rate, a failure rate, a usage rate, or another metric associated with the processed data representation.

In some implementations, the data processing system 102 may identify a set of compliance requirements for a dataset. For example, the data processing system 102 may receive information identifying a data anonymization requirement, a data privacy requirement, a data expiration requirement (e.g., a requirement to remove data after a configured period of time), or another type of requirement. In this case, the data processing system 102 may determine whether the set of compliance requirements is satisfied for the dataset using the processed data representation. For example, the data processing system 102 may parse connections between a particular dataset and other datasets or functions, represented in the processed data representation, to determine whether the particular dataset is deleted (and any references to the particular dataset are deleted) after the configured period of time. In some implementations, the data processing system 102 may provide a visualization of whether the set of compliance requirements is satisfied and/or may automatically perform an action on the one or more datasets to ensure that the set of compliance requirements are satisfied. For example, the data processing system 102 may transform the particular dataset (e.g., to anonymize the particular dataset) to ensure that the set of compliance requirements are satisfied.

As indicated above, FIGS. 1A-1C are provided as an example. Other examples may differ from what is described with regard to FIGS. 1A-1C. The number and arrangement of devices shown in FIGS. 1A-1C are provided as an example.

Figure 2:
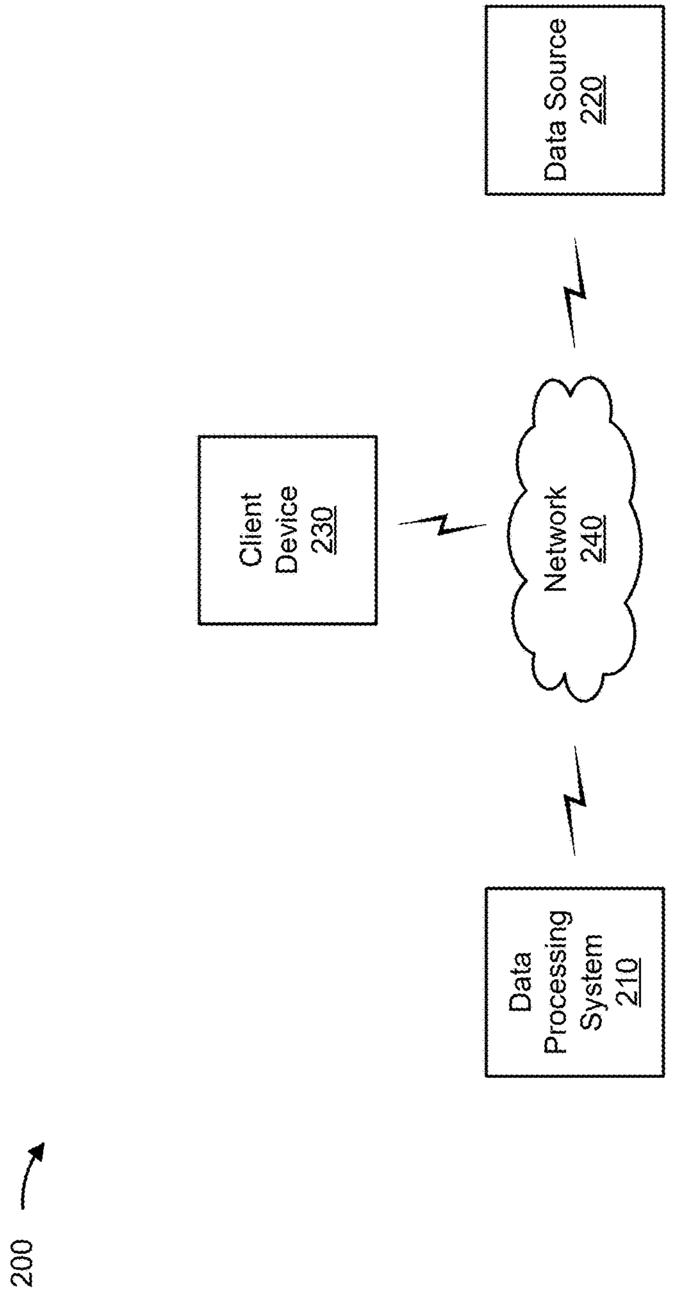
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a data processing system 210, a data source 220, a client device 230, and a network 240. Devices of environment 200 may interconnect via wired connections, wireless connections, or a combination of wired and wireless connections.

The data processing system 210 may include one or more devices capable of receiving, generating, storing, processing, providing, and/or routing information associated with a processed data representation of a group of datasets, as described elsewhere herein. The data processing system 210 may include a communication device and/or a computing device. For example, the data processing system 210 may include a server, such as an application server, a client server, a web server, a database server, a host server, a proxy server, a virtual server (e.g., executing on computing hardware), or a server in a cloud computing system. In some implementations, the data processing system 210 may include computing hardware used in a cloud computing environment. In some implementations, the data processing system 210 may correspond to the data processing system 102 described in connection with FIGS. 1A-1C.

The data source 220 may include one or more devices capable of receiving, generating, storing, processing, and/or providing information associated with a representation of a group of datasets, as described elsewhere herein. The data source 220 may include a communication device and/or a computing device. For example, the data source 220 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 220 may communicate with one or more other devices of environment 200, as described elsewhere herein. In some implementations, the data source 220 may correspond to the data source 104 described in connection with FIGS. 1A-1C.

The client device 230 may include one or more devices capable of receiving, generating, storing, processing, and/or providing information associated with providing visualizations of a processed data representation of a group of datasets, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the client device 230 may correspond to the client device 106 described in connection with FIGS. 1A-1C.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
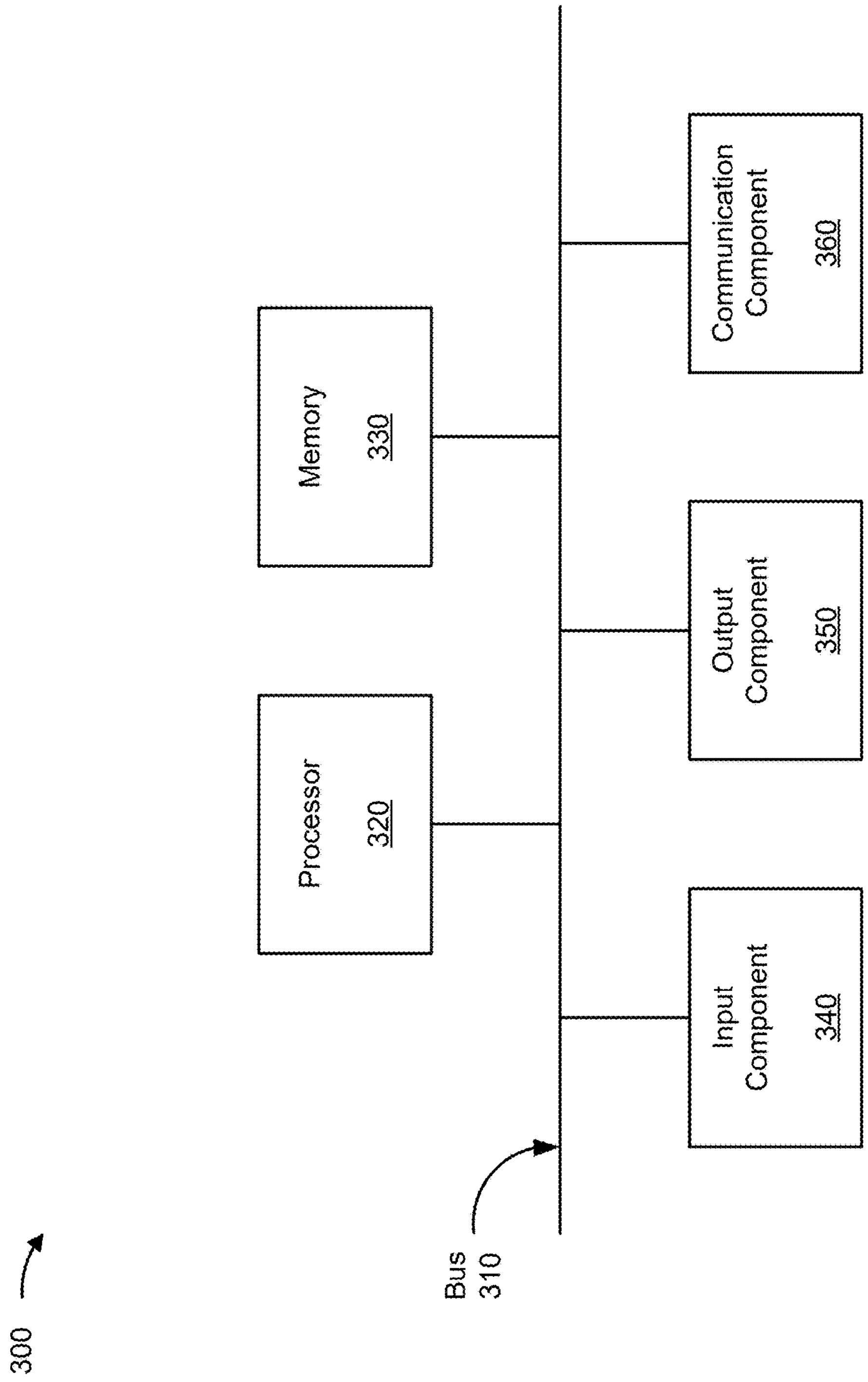
FIG. 3 is a diagram of example components of a device associated with performing linkage analysis on a group of datasets, in accordance with some embodiments of the present disclosure.

FIG. 3 is a diagram of example components of a device 300 associated with performing linkage analysis on a group of datasets. The device 300 may correspond to data processing system 210, data source 220, and/or client device 230. In some implementations, data processing system 210, data source 220, and/or client device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
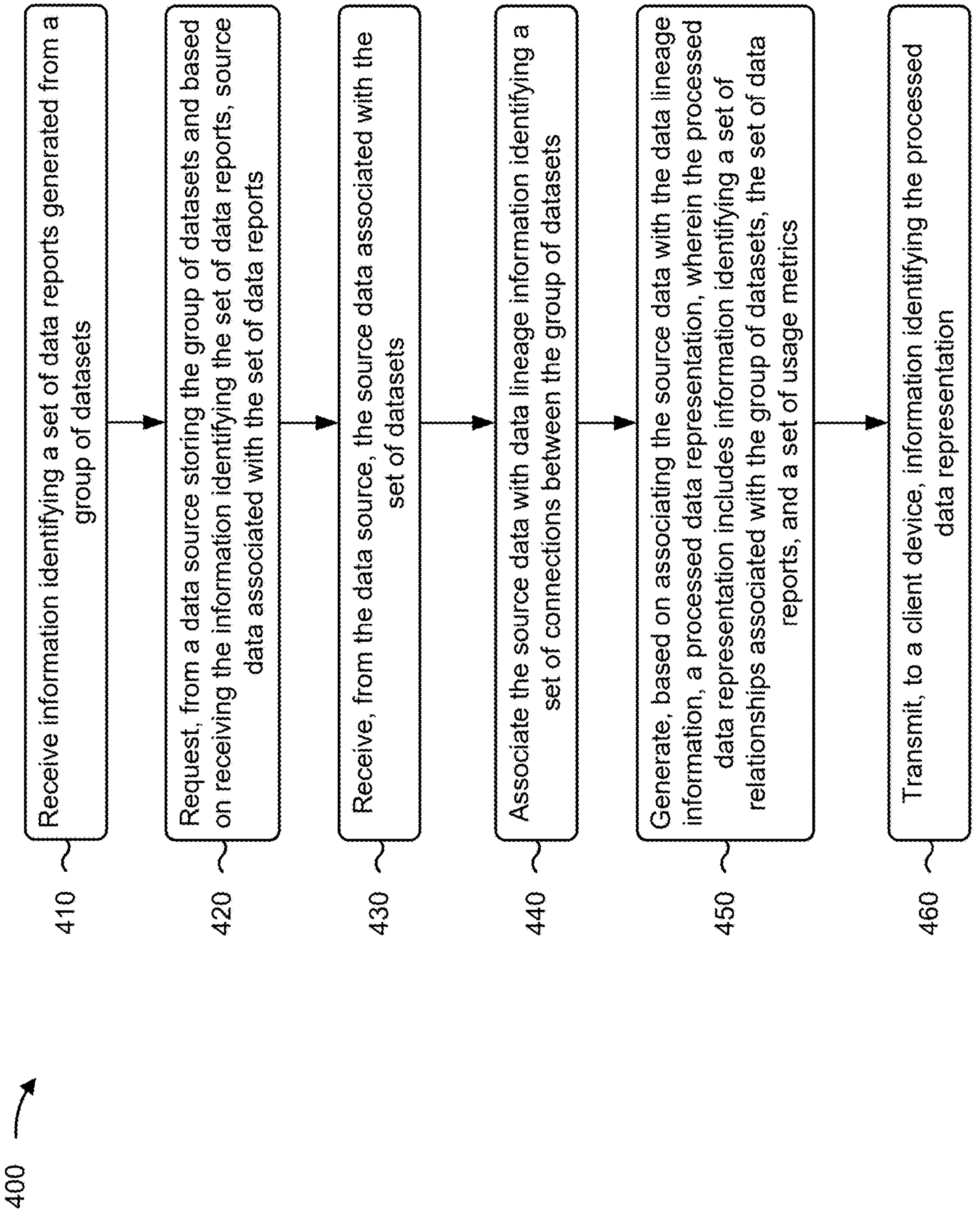
FIG. 4 is a flowchart of an example process associated with using a data processing system with linkage analysis, in accordance with some embodiments of the present disclosure.

FIG. 4 is a flowchart of an example process 400 associated with using a data processing system with linkage analysis. In some implementations, one or more process blocks of FIG. 4 may be performed by the data processing system 210. In some implementations, one or more process blocks of FIG. 4 may be performed by another device or a group of devices separate from or including the data processing system 210, such as the data source 220 and/or the client device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving information identifying a set of data reports generated from a group of datasets (block 410). For example, the data processing system 210 (e.g., using processor 320, memory 330, input component 340, and/or communication component 360) may receive information identifying a set of data reports generated from a group of datasets, as described above in connection with reference number 150 of FIG. 1A. As an example, the data processing system 210 may receive information identifying a data lineage, which may include information identifying a set of input datasets, a set of transformations performed on the set of input datasets, and a set of output datasets.

As further shown in FIG. 4, process 400 may include requesting from a data source storing the group of datasets, and based on receiving the information identifying the set of data reports, source data associated with the set of data reports (block 420). For example, the data processing system 210 (e.g., using processor 320 and/or memory 330) may request from a data source storing the group of datasets, and based on receiving the information identifying the set of data reports, source data associated with the set of data reports, as described above in connection with reference number 150 of FIG. 1A. As an example, the data processing system 210 may request data report information identifying underlying data of a group of datasets that are included in a data lineage.

As further shown in FIG. 4, process 400 may include receiving, from the data source, the source data associated with the set of datasets (block 430). For example, the data processing system 210 (e.g., using processor 320, memory 330, input component 340, and/or communication component 360) may receive, from the data source, the source data associated with the set of datasets, as described above in connection with reference number 150 of FIGS. 1A and 1*n* connection with reference number 154 of FIG. 1B. As an example, the data processing system 210 may receive the data report information identifying the underlying data of a group of datasets that are included in a data lineage. As another example, the data processing system 210 may receive a set of query stats and metric execution stats identifying requests for reports generated form the underlying data or datasets.

As further shown in FIG. 4, process 400 may include associating the source data with data lineage information identifying a set of connections between the group of datasets (block 440). For example, the data processing system 210 (e.g., using processor 320 and/or memory 330) may associate the source data with data lineage information identifying a set of connections between the group of datasets, as described above in connection with reference number 152 of FIG. 1A. As an example, the data processing system 210 may generate data lineage information and may associate underlying data with representations of the underlying data in the data lineage information.

As further shown in FIG. 4, process 400 may include generating, based on associating the source data with the data lineage information, a processed data representation, wherein the processed data representation includes information identifying a set of relationships associated with the group of datasets, the set of data reports, and a set of usage metrics (block 450). For example, the data processing system 210 (e.g., using processor 320 and/or memory 330) may generate, based on associating the source data with the data lineage information, a processed data representation, wherein the processed data representation includes information identifying a set of relationships associated with the group of datasets, the set of data reports, and a set of usage metrics, as described above in connection with reference number 156 of FIG. 1B. As an example, the data processing system 210 may use one or more machine learning or statistical algorithms to determine characteristics of datasets of a data lineage and usage metrics associated therewith. In some examples, the data processing system 210 may generate a set of user interface views identifying the characteristics.

As further shown in FIG. 4, process 400 may include transmitting, to a client device, information identifying the processed data representation (block 460). For example, the data processing system 210 (e.g., using processor 320, memory 330, and/or communication component 360) may transmit, to a client device, information identifying the processed data representation, as described above in connection with reference number 160 of FIG. 1C. As an example, the data processing system 210 may provide one or more user interface visualizations of the processed data representation for display via a client device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data processing, the system comprising:

one or more memories; and one or more processors, communicatively coupled to the one or more memories, configured to:

receive information identifying a set of data reports generated from a group of datasets;

request, from a data source storing the group of datasets, source data associated with the set of data reports based on receiving the information identifying the set of data reports;

receive, from the data source, the source data associated with the set of data reports;

associate the source data with data lineage information identifying a set of connections between the group of datasets;

process, based on associating the source data with the data lineage information, the source data, the data lineage information, and a set of usage metrics associated with the set of data reports, to generate a processed data representation, wherein the processed data representation includes information identifying a set of relationships associated with the group of datasets and the set of data reports;

locate a report, of the set of data reports, associated with an error in existing code;

generate new code for the report; and replace the existing code with the new code to automatically resolve the error;

determine a set of key performance indicators, wherein the set of key performance indicators are used to identify a first threshold level and a second threshold level of usage for the processed data representation;

determine a level of usage of a dataset, of the group of datasets, in connection with resources, when the level of usage of the dataset satisfies the first threshold level of usage:

automatically allocate additional resources to support the dataset, and when the level of usage of the dataset does not satisfy the second threshold level of usage:

automatically remove the dataset from the group of datasets, and automatically reallocate one or more resources associated with storing the dataset toward another purpose; and transmit, to a client device, information identifying the processed data representation and resource allocation.

2. The system of claim 1, wherein the one or more processors are further configured to:

generate a set of user interface visualizations of the processed data representation; and wherein the one or more processors, to transmit the information identifying the processed data representation, are to:

provide the set of user interface visualizations for display via a user interface of the client device.

3. The system of claim 1, wherein the one or more processors are further configured to:

generate a graph representation of the processed data representation, wherein the graph representation includes a set of nodes and a set of edges, the set of nodes representing a set of reports or tables, the set of edges representing a set of linkages between the reports or the tables;

generate a visualization of the graph representation; and wherein the one or more processors, to transmit information identifying the processed data representation, are to:

provide the visualization of the graph representation for display via a user interface of the client device.

4. The system of claim 1, wherein the one or more processors are further configured to:

determine a status of one or more queries associated with the processed data representation; and wherein the one or more processors, to transmit information identifying the processed data representation, are to:

provide information identifying the status of the one or more queries.

5. The system of claim 1, wherein the one or more processors are further configured to:

determine a resource utilization associated with the set of data reports; and wherein the one or more processors, to transmit information identifying the processed data representation, are to:

provide information identifying the resource utilization.

6. The system of claim 1, wherein the one or more processors are further configured to:

generate a set of visualizations of the set of usage metrics; and wherein the one or more processors, to transmit information identifying the processed data representation, are to:

provide information identifying the set of visualizations of the set of usage metrics.

7. The system of claim 1, wherein the one or more processors, to transmit information identifying the processed data representation, are to:

provide information identifying the set of key performance indicators.

8. A non-transitory computer-readable medium storing a set of instructions, the set of instructions comprising:

one or more instructions that, when executed by one or more processors of a system, cause the system to:

receive information identifying a set of data reports generated from a group of datasets;

request, from a data source storing the group of datasets, source data associated with the set of data reports based on receiving the information identifying the set of data reports;

receive, from the data source, the source data associated with the set of data reports;

associate the source data with data lineage information identifying a set of connections between the group of datasets;

process, based on associating the source data with the data lineage information, the source data, the data lineage information, and a set of usage metrics associated with the set of data reports to generate a processed data representation, wherein the processed data representation includes information identifying a set of relationships associated with the group of datasets and the set of data reports;

receive information identifying a dataset, of the group of datasets;

generate, using the processed data representation, a visualization relating to usage of the dataset in connection with the set of reports;

provide, for display via a user interface of a client device, information identifying the visualization;

locate a report, of the set of data reports, associated with an error in existing code;

generate new code for the report; and replace the existing code with the new code to automatically resolve the error;

determine a set of key performance indicators, wherein the set of key performance indicators are used to identify a first threshold level and a second threshold level of usage for the processed data representation; and determine a level of usage of the dataset in connection with resources, when the level of usage of the dataset satisfies the first threshold level of usage:

automatically allocate additional resources to support the dataset, and when the level of usage of the dataset does not satisfy the second threshold level of usage:

automatically remove the dataset from the group of datasets, and automatically reallocate one or more resources associated with storing the dataset toward another purpose.

9. The non-transitory computer-readable medium of claim 8, wherein the one or more instructions further cause the system to:

determine the data lineage information for the group of datasets.

10. The non-transitory computer-readable medium of claim 9, wherein the one or more instructions, that cause the system to determine the data lineage information, cause the system to:

identify a first one or more datasets, of the group of datasets, that are an input to a process;

identify a second one or more datasets, of the group of datasets, that are an output of the process; and generate an association between the first one or more datasets and the second one or more datasets.

11. The non-transitory computer-readable medium of claim 10, wherein the one or more instructions, that cause the system to generate the visualization, cause the one or more instructions to:

generate the visualization based on one or more generated associations of the data lineage information.

12. The non-transitory computer-readable medium of claim 8, wherein the one or more instructions further cause the system to:

identify a set of compliance requirements for the dataset;

determine, based on the processed data representation, whether the set of compliance requirements is satisfied for the dataset; and wherein the one or more instructions, that cause the system to transmit information identifying the processed data representation, cause the system to:

transmit information indicating whether the set of compliance requirements is satisfied for the dataset.

13. A method, comprising:

receiving, by a device, information identifying a set of data reports generated from a group of datasets;

requesting, by the device, from a data source storing the group of datasets, and based on receiving the information identifying the set of data reports, source data associated with the set of data reports;

receiving, by the device and from the data source, the source data associated with the set of data reports;

associating, by the device, the source data with data lineage information identifying a set of connections between the group of datasets;

generating, by the device and based on associating the source data with the data lineage information, a processed data representation, wherein the processed data representation includes information identifying a set of relationships associated with the group of datasets, the set of data reports, and a set of usage metrics;

locating, by the device, a report, of the set of data reports, associated with an error in existing code;

generating, by the device, new code for the report;

replacing, by the device, the existing code with the new code to automatically resolve the error;

determining, by the device, a set of key performance indicators, wherein the set of key performance indicators are used to identify a first threshold level and a second threshold level of usage for the processed data representation;

determining, by the device, a level of usage of a dataset, of the group of datasets, in connection with resources, when the level of usage of the dataset satisfies the first threshold level of usage:

automatically allocating additional resources to support the dataset, and when the level of usage of the dataset does not satisfy the second threshold level of usage:

automatically removing the dataset from the group of datasets, and automatically reallocating one or more resources associated with storing the dataset toward another purpose; and transmitting, by the device and to a client device, information identifying the processed data representation and resource allocation.

14. The method of claim 13, further comprising:

generating a set of user interface visualizations of the processed data representation; and wherein transmitting the information identifying the processed data representation comprises:

providing the set of user interface visualizations for display via a user interface of the client device.

15. The method of claim 13, wherein transmitting information identifying the processed data representation comprises:

providing information identifying the set of key performance indicators.

16. The method of claim 13, further comprising:

determining the data lineage information for the group of datasets.

17. The method of claim 16, wherein determining the data lineage information comprises:

identifying a first one or more datasets, of the group of datasets, that are an input to a process;

identifying a second one or more datasets, of the group of datasets, that are an output of the process; and generating an association between the first one or more datasets and the second one or more datasets.

18. The method of claim 13, further comprising:

identifying a set of compliance requirements for a dataset of the group of datasets; and determining, based on the processed data representation, whether the set of compliance requirements is satisfied for the dataset; and wherein transmitting information identifying the processed data representation comprises:

transmitting information indicating whether the set of compliance requirements is satisfied for the dataset.

19. The non-transitory computer-readable medium of claim 8, wherein the one or more instructions that further, cause the system to:

transform an original dataset of the group of data sets, using a set of weights of a machine learning model.

20. The non-transitory computer-readable medium of claim 8, wherein the one or more instructions, that cause the system to generate the visualization relating to usage of the dataset in connection with the set of reports, cause the system to:

generate the visualization that illustrates a quantity of reports, a quantity of metrics, a quantity of users, or a set of costs.

* * * * *